United States Patent
Sakoda et al.

(10) Patent No.: US 6,226,526 B1
(45) Date of Patent: May 1, 2001

(54) TRANSMISSION POWER CONTROL METHOD, BASE STATION APPARATUS AND COMMUNICATION TERMINAL

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/216,503

(22) Filed: Dec. 18, 1998

(30) Foreign Application Priority Data

Dec. 27, 1997 (JP) .................................................. 9-367732

(51) Int. Cl.[7] ....................................................... H04B 7/00
(52) U.S. Cl. ............................. 455/522; 455/68; 455/69; 455/70
(58) Field of Search ................................. 455/68, 69, 70, 455/522, 127, 38.3; 370/314, 320, 337

(56) References Cited

U.S. PATENT DOCUMENTS

| | | | |
|---|---|---|---|
| 5,333,175 | * 7/1994 | Ariyavisitakul et al. | 379/58 |
| 5,590,409 | * 12/1996 | Sawahashi et al. | 455/69 |
| 5,960,361 | * 9/1999 | Chen | 455/522 |
| 6,002,942 | * 12/1999 | Park | 455/522 |
| 6,097,947 | * 8/2000 | Takai | 455/424 |

* cited by examiner

*Primary Examiner*—Daniel Hunter
*Assistant Examiner*—Lana Le
(74) *Attorney, Agent, or Firm*—Oblon, Spivak, McClelland, Maier & Neustadt, P.C.

(57) ABSTRACT

In a transmission power control method, a base station apparatus and a communication terminal, transmission between the transmission side and the reception side can be preformed with an optimum transmission power. In the transmission power control method in which at the transmission side, a control signal for controlling the transmission power is transmitted, while at the reception side, the transmission power is controlled based on the received control signal, with the power value of the transmission power having reached the limit value of a power control range, if the instructions of the received control signal are to control the power value in the direction of allowing it to exceed the power control range, the number of receptions of the control signal is counted, and if the instructions of the control signal received thereafter are to control the power value in the direction of not allowing it to exceed the power control range, the count value of the number of receptions is decreased, and the power value is not controlled in the direction of not allowing it to exceed the power control range until the count value reaches a predetermined value.

12 Claims, 6 Drawing Sheets

TRANSMISSION POWER CONTROL METHOD, BASE STATION APPARATUS AND COMMUNICATION TERMINAL

BACKGROUND OF THE INVENTION

1. Field of the Invention

The present invention relates to a transmission power control method, a base station apparatus and a communication terminal and more particularly, is preferably applied to a cellular radio communication system.

2. Description of the Related Art

In a cellular radio communication system, an area in which communication service is provided is divided into cells of a desired size, a base stations is located in each of the cells as a fixed station, and a communication terminal as a mobile station radio-communicates with the base station whose communication condition is considered to be the best.

In such a cellular radio communication system, large transmission power is required for transmission or even small transmission power is enough for communication, depending on the location of the mobile station when desired communication is performed.

Accordingly, in the cellular radio communication system, the base station and the communication terminal monitor a reception power (or quality of the reception power) each other, and form a feedback loop by notifying the monitoring result to each other, to perform transmission power control for communication with the minimum transmission power.

Thus, the cellular radio communication system enables communication to be efficiently performed with the minimum transmission power, so that the power consumption can be reduced as compared with the case where the communication is performed with fixed power. Therefore, a communication terminal can be particularly provided with a distinctive advantage that a lifetime of a battery can be prolonged. Such a cellular radio communication system is described as follows.

In FIG. 1, 1 generally represents a cellular radio communication system of the time division multiple access (TDMA) method, which performs the communication by connecting a base station 2 to a communication terminal 3 with a radio circuit. In this case, the base station 2 comprises a reception unit 4, a control unit 5 and a transmission unit 6, and the communication terminal 3 also comprises a reception unit 7, a control unit 8 and a transmission unit 9. The base station 2 and the communication terminal 3 use these circuit blocks to communicate with each other.

The reception unit 4 of the base station 2 receives a transmission signal from the communication terminal 3, demodulates the incoming transmission data and detects the control data, included in the transmission signal, for power control, and transmits the detected control data to the control unit 5. Further, the reception unit 4 detects a signal-to-interference wave power ratio C/I (the ratio of the desired wave power and the interference wave power) of the transmission signal from the communication terminal 3, and also transmits the detected signal-to-interference wave power ratio C/I to the control unit 5.

The control unit 5 generates a power control signal for controlling the transmission power of the local station based on the control data from the reception unit 4, and sends it out to the transmission unit 6. Moreover, the control unit 5 generates control data for controlling the transmission power of the communication terminal 3 based on the signal-to-interference wave power ratio C/I from the reception unit 4, and also sends it out to the transmission unit 6.

The transmission unit 6 controls the transmission power of the local station based on the power control signal supplied from the control unit 5, and inserts the control data supplied from the control unit 5 into the transmission data in order to generate a transmission signal, and sends the transmission signal to the communication terminal 3.

In the same way, the reception unit 7 of the communication terminal 3 receives the transmission signal from the base station 2, demodulates the incoming transmission data and detects the control data, included in the transmission signal, for power control, and transmits the detected control data to the control unit 8. Further, the reception unit 7 detects a signal-to-interference wave power ratio C/I of the transmission signal from the base station 2, and transmits the detected signal-to-interference wave power ratio C/I to the control unit 8.

The control unit 8 generates a power control signal for controlling the transmission power of the local station based on the control data from the reception unit 7, and sends it out to the transmission unit 9. Moreover, the control unit 8 generates control data for controlling the transmission power of the base station 2 based on the signal-to-interference wave power ratio C/I from the reception unit 7, and also sends it out to the transmission unit 9.

The transmission unit 9 controls the transmission power of the local station based on the power control signal received from the control unit 8, and inserts the control data supplied from the control unit 8 into transmission data in order to generate a transmission signal, and sends the transmission signal to the base station 2.

In the transmission units 6 and 9 of the cellular radio communication system 1, frequency hopping (FH) is performed to randomly change the frequency channel to be used, according to a predetermined pattern for every slot, so that the effects of the interference waves from other communications can be reduced.

As described above, in the cellular radio communication system 1, the base station 2 and the communication terminal 3 detect the signal-to-interference wave power ratio C/I of the transmission signal from each other, and notify the control data of the transmission power according to the detection result to each other, thereby to control the transmission power.

With respect to the cellular radio communication system 1, the flowchart of FIG. 2 is used to explain the transmission power control procedure in the control unit 8, which controls the transmission power of the communication terminal 3 based on the control data for the power control supplied from the base station 2.

The control unit 8 of the communication terminal 3 begins with the starting step RT1, and moves to the step SP1. In the step SP1, the control unit 8 first accepts a power control command from the reception unit 7, and moves to the step SP2.

In the step SP2, the control unit 8 determines whether the power control command is a power-up command, which means increase of the transmission power, or not. If the positive result is obtained, the result means a power-up command is accepted, then the control unit 8 moves to the step SP3.

In the step SP3, the control unit 8 determines whether the current transmission power is smaller than the maximum transmission power or not. If the positive result is obtained, the result means there is room to further increase the transmission power, and the control unit 8 moves to the step SP4. On the other hand, if the negative result is obtained in the step SP3, the result means that the current transmission power has already reached the maximum transmission power and the transmission power cannot be increased any more, and the control unit 8 returns to the step SP1 again while maintaining this state.

In the step SP4, the control unit 8 sends out the power-up command to the transmission unit 9 to increase the transmission power by a predetermined level with the transmission unit 9, and returns to the step SP1 again. However, if the negative result is obtained in the step SP2, the result means a power-down command, not a power-up command, has been accepted, and the control unit 8 moves to the step SP5.

In the step SP5, the control unit 8 determines whether the current transmission power is larger than the minimum transmission power or not. The positive result is obtained, the result means there is room to further lower the transmission power, the control unit 8 moves to the step SP6. In the step SP6, the control unit 8 sends out the power-down command to the transmission unit 9 to lower the transmission power by a predetermined level with the transmission unit 9, and returns to the step SP1 again.

On the other hand, if the negative result is obtained in the step SP5, the result means that the current transmission power has already reached the minimum transmission power and the transmission power cannot be lowered any more, and the control unit 8 returns to the step SP1 again while maintaining this state.

In the cellular radio communication system 1 having such configuration, the base station 2 and the communication terminal 3 monitor the reception power (or quality of the reception power) each other, and notify the monitoring result to each other, to form a feedback loop for performing the transmission power control. However, a transmission error can occur during the transmission of the monitoring result to each other through the feedback loop, so that the power-up command and the power-down command are inverted respectively.

For instance, in the communication terminal 3, when a power-up command is repeatedly sent from the base station 2 regardless of the current transmission power being the maximum because the base station 2 and the communication terminal 3 are distant from each other, if a power-down command is sent due to a transmission error, the transmission power is lowered according to the power-down command even though the transmission power is desired to be increased because the transmission power is obviously insufficient. As a result, the cellular radio communication system 1 has a problem that communication quality cannot be maintained between the base station 2 and the communication terminal 3.

Further, in the communication terminal 3, when a power-down command is repeatedly sent from the base station 2 regardless of the current transmission power being the minimum because the distance between the base station 2 and the communication terminal 3 has become shorter, if a power-up command is sent due to a transmission error, the transmission power is increased according to the power-up command even though the transmission power is desired to be lowered because the transmission power is obviously sufficient. As a result, the communication with an optimum transmission power according to the distance between the base station 2 and the communication terminal 3 cannot be performed, thus the cellular radio communication system 1 has problems that an increase in the power consumption is caused and an interference wave to other channels occurs.

Further, in the cellular radio communication system 1 of the TDMA method, the frequency hopping (FH) is performed to randomly change the frequency channel to be used according to a predetermined pattern (diagonally shaded portions) for each slot, as shown in FIG. 3. In this case, even though the base station 2 and the communication terminal 3 are distant from each other and the current transmission power should be maximized, if a certain slot SLT1 accidentally becomes immune against the effect of the interference waves from other communications so that the communication condition becomes good, then a power-down command can be supplied from the base station 2.

In such case, if the communication terminal 3 lowers the transmission power according to the accidental power-down command, the transmission power is short again in the next frequency hopping. Accordingly, since it is possible that a power-down command due to some error is sent, the communication terminal 3 has a problem that communication quality cannot be maintained if the transmission power is easily lowered.

SUMMARY OF THE INVENTION

In view of the foregoing, an object of the present invention is to provide a transmission power control method, a base station apparatus and a communication terminal, which always enable the transmission with an optimum transmission power.

The nature, principle and utility of the invention will become more apparent from the following detailed description when read in conjunction with the accompanying drawings in which like parts are designated by like. reference numerals or characters.

DETAILED DESCRIPTION OF THE EMBODIMENT

Preferred embodiments of the present invention will be described with reference to the accompanying drawings:

(1) Configuration of the Cellular Radio Communication System

Figure 1:
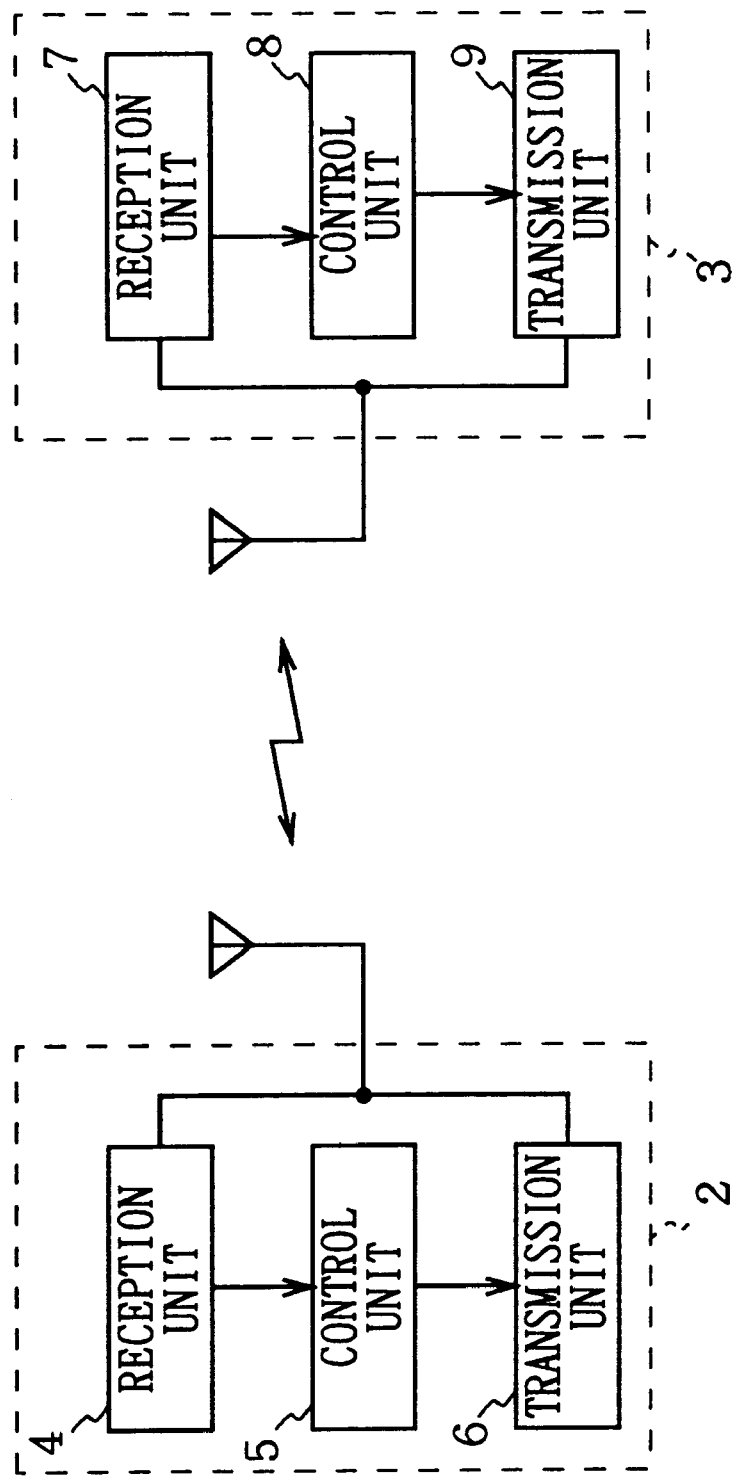
FIG. 1 is a block diagram showing the configuration of the conventional cellular radio communication system.
Figure 4:
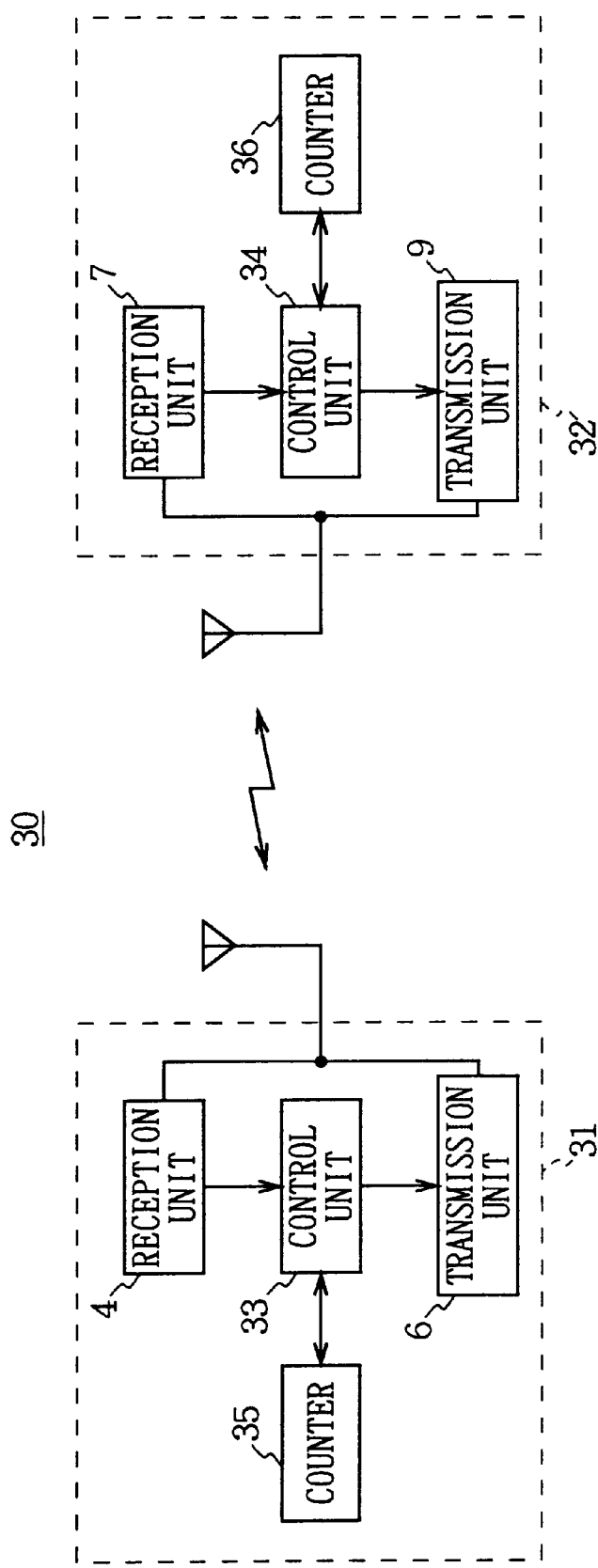
FIG. 4 is a block diagram showing the configuration of the cellular radio communication system in an embodiment according to the present invention.

In FIG. 4 in which the portions corresponding to FIG. 1 are assigned the same symbols, 30 represents a cellular radio communication system of the TDMA method as a whole, and communication is performed by connecting a base station apparatus 31 to a communication terminal 32 with a wireless circuit.

The reception unit 4 of the base station 31 receives a transmission signal from the communication terminal 32, demodulates the incoming transmission data and detects the control data, included in the transmission signal, for the power control, and transmits the detected control data to a control unit 33. Further, the reception unit 4 detects a signal-to-interference wave power ratio C/I of the transmission signal from the communication terminal 32, and also transmits the detected signal-to-interference wave power ratio C/I to the control unit 33.

The control unit 33 generates a power control signal for controlling the transmission power of the local station based on the control data from the reception unit 4, and sends it out to the transmission unit 6. Moreover, the control unit 33 generates control data for controlling the transmission power of the communication terminal 32 based on the signal-to-interference wave power ratio C/I from the reception unit 4, and also sends it out to the transmission unit 6.

The transmission unit 6 controls the transmission power of the local station based on the power control signal received from the control unit 33, generates a transmission signal by inserting the control data supplied from the control unit 33 into transmission data, and sends it out to the communication terminal 32.

In the same way, the reception unit 7 of the communication terminal 32 receives the transmission signal from the base station 31, and demodulates the incoming transmission data and detects the control data for the power control included in the transmission signal, and transmits the detected control data to a control unit 34. Further, the reception unit 7 detects a signal-to-interference wave power ration C/I of the transmission signal from the base station 31, and transmits the detected signal-to-interference wave power ratio C/I to the control unit 34.

The control unit 34 generates a power control signal for controlling the transmission power of the local station based oh the control data from the reception unit 7, and sends it out to the transmission unit 9. Moreover, the control unit 34 generates control data for controlling the transmission power of the base station 31 based on the signal-to-interference wave power rat io C/I from the reception unit 7, and also sends it out to the transmission unit 9.

The transmission unit 9 controls the transmission power of the local station based on the power control signal supplied from the control unit 34, generates a transmission signal by inserting the control data supplied from the control unit 34 into the transmission data, and sends it out to the base station 31.

In the transmission units 6 and 9 of the cellular radio communication system 30, the frequency hopping (FH) is performed to randomly change the frequency channel to be used according to a predetermined pattern for every slot, to reduce the effect of the interference waves from other communications.

Thus, in the cellular radio communication system 30, the base station 31 and the communication terminal 32 detect the signal-to-interference wave power ratio C/I of the transmission signal from each other, and notify the control data of the transmission power according to the detection result to each other, to control the transmission power.

In this case, the base station 31 and the communication terminal 32 are provided with the new control units 33 and 34 which perform different control from the control units 5 and 8 of the cellular radio communication system 1, and counters 35 and 36 are connected to the control units 33 and 34 respectively.

The reception unit 7, the control unit 34, and the transmission unit 9 of the communication terminal 32 are described as follows. Since the circuit constructions of the base station 31 and the communication terminal 32 are the same, the description of the reception unit 4, the control unit 33, and the transmission unit 6 of the base station 31 is omitted.

(2) Configuration of the Communication Terminal

Figure 2:
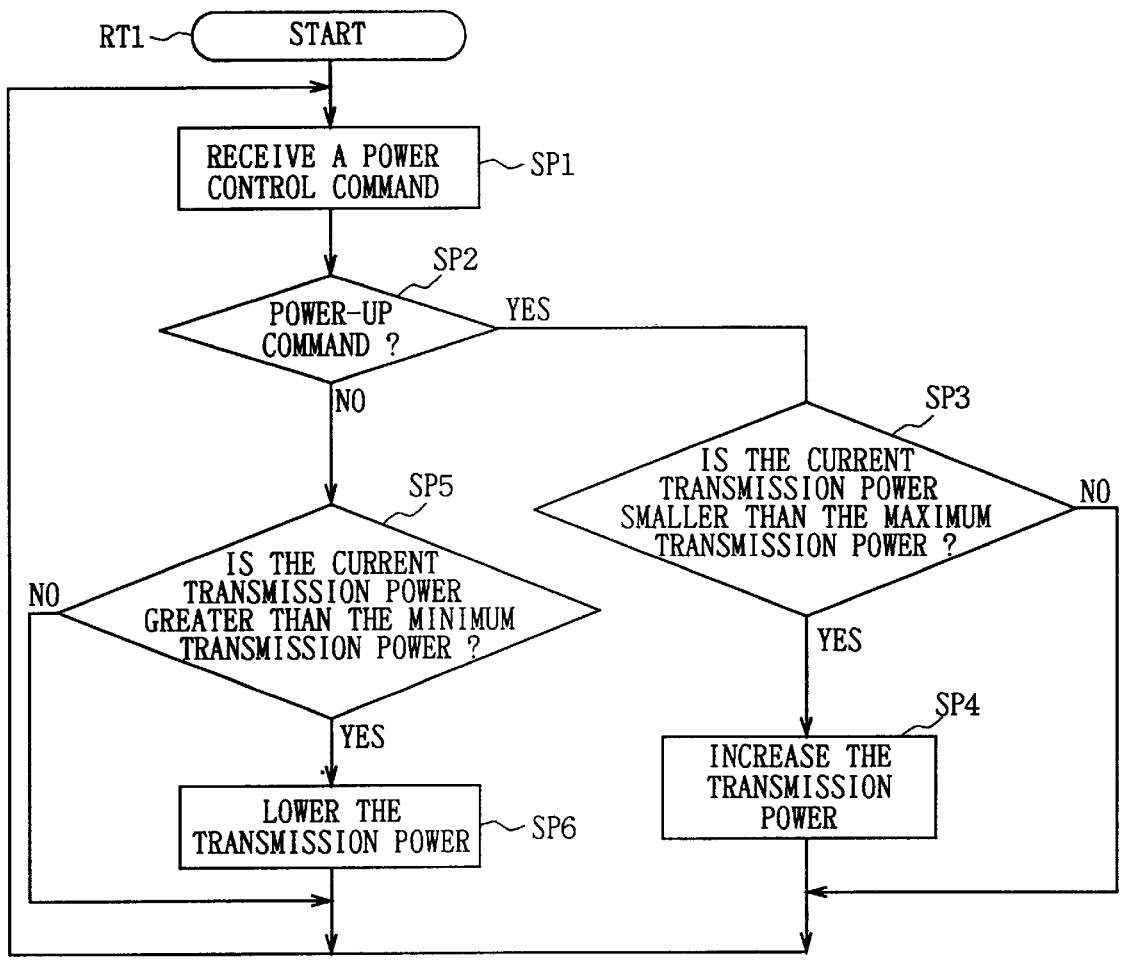
FIG. 2 is a flowchart showing the conventional transmission power control procedure.
Figure 3:
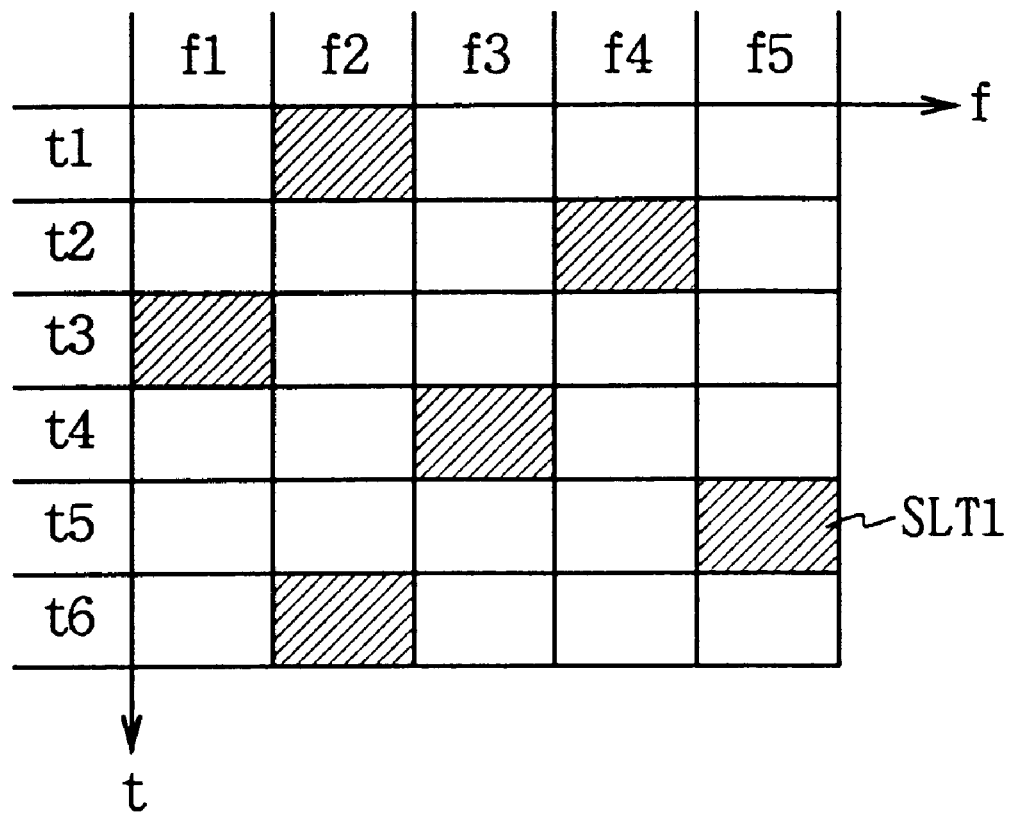
FIG. 3 is a schematic diagram explaining the frequency hopping.
Figure 5:
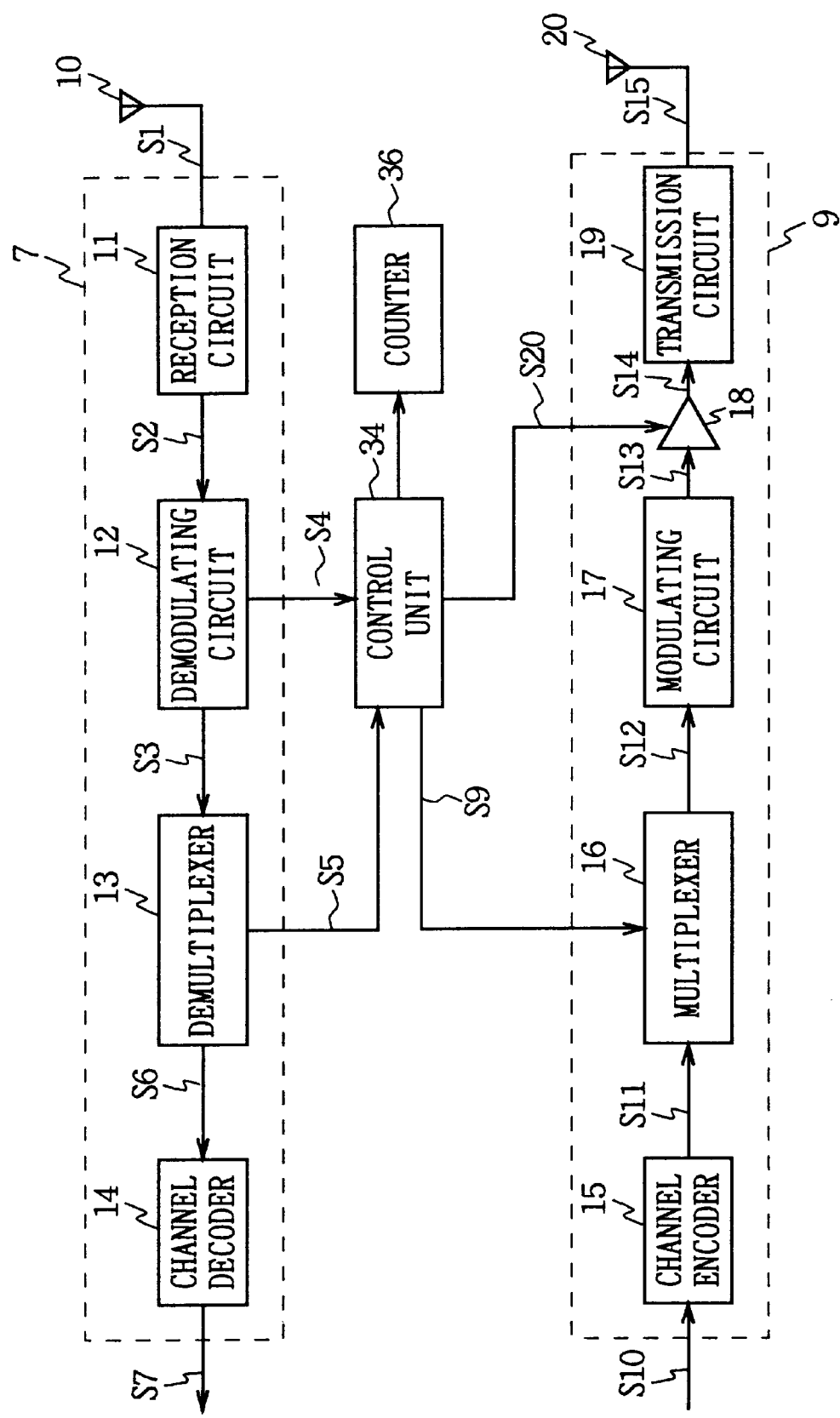
FIG. 5 is a block diagram showing the configuration of the communication terminal in an embodiment according to the present invention.

As shown in FIG. 5 in which the portions corresponding to FIG. 2 are assigned the same symbols, in the reception unit 7, the received signal S1 received first via an antenna 10 is amplified and then, it is subjected to a frequency conversion process to extract a base band signal. The base band signal is subjected to a filtering process and thereafter an analog-to-digital conversion process, so that a received signal S2 is generated and sent out to a demodulating circuit 12.

The demodulating circuit 12 applies a predetermined demodulation process to the received signal S2, and sends out the resultant group of received symbols S3 to a demultiplexer 13. Moreover, the demodulating circuit 12 detects the signal-to-interference wave power ratio C/I of the received signal S2 for every slot, and sends out detection data S4 representing the detected signal-to-interference wave power ratio C/I to the control unit 34.

The demultiplexer 13 extracts a control symbol S5 for the power control from the supplied group of received symbols S3, and sends out the control symbol S5 to the control unit 34. Incidentally, in this example, one symbol is inserted into each slot of the control symbol S5 for the power control.

Further, the demultiplexer 13 sends out a received symbol S6 which remains after extracting the control symbol S5, to a channel decoder 14. The channel decoder 14 applies a predetermined symbol demodulation process to the received symbol S6 to restore a received data bit S7 from the received symbol S6, and outputs the received data bit S7 to an audio signal processing circuit (not shown) in the subsequent stage.

The control unit 34 detects the control data for the transmission power instructed by the base station 31, based on the control symbol S5 supplied from the demultiplexer 13, and generates a power control signal S20 according to the detected data in order to send it out to the transmission unit 9. Moreover, the control unit 34 generates control data for the transmission power of the base station 31 based on the signal-to-interference wave power ratio C/I shown by the supplied detected data S4, and generates a control symbol S9 representing the control data so as to output it to the transmission unit 9.

In case of generating the control symbol S9, the control unit 34 compares the signal-to-interference wave power ratio C/I with a first threshold value, and generates control data for lowering the transmission power by one dB if the ratio C/I is greater than the first threshold value. Further, the control unit 34 compares the signal-to-interference wave power ratio C/I with a second threshold value, and generates control data for increasing the transmission power by one dB if the ratio C/I is smaller than the second threshold value. Thus, the control unit 34 generates the control symbol S9 based on the control data. In addition, since the control unit 34 detects the signal-to-interference wave power ratio C/I for every slot, the control unit 34 generates one control symbol S9 for one slot.

On the other hand, in the transmission unit 9, a transmission data bit S10 to be sent, which is supplied from the audio signal processing unit (not shown) is first input to a channel encoder 15. The channel encoder 15 performs a predetermined coding process to generate a transmission symbol S11, and sends it out to a multiplexer 16.

The multiplexer 16 receives the control symbol S9 from the control unit 34, and also receives the transmission symbol S11 from the channel encoder 15. The multiplexer 16 generates a transmission symbol S12 by inserting the control symbol S9 into a predetermined position of the transmission symbol S11, and sends it out to a modulating circuit 17. Incidentally, since one control symbol S9 is generated for one slot, one control symbol S9 is inserted for one slot.

The modulating circuit 17 applies a predetermined modulation process to the transmission symbol S12 in order to generate a transmission signal S13, and sends it out to a variable gain amplifier 18. The variable gain amplifier 18 receives a power control signal S20 from the control unit 34, amplifies the transmission signal S13 with a gain value based on the power control signal S20 in order to generate a transmission signal S14 of the transmission power instructed by the base station 31, and sends it out to a transmission circuit 19.

The transmission circuit 19 applies a filtering process to the transmission signal S14 and then a digital-to-analog conversion process, and after applying a high-frequency process such as frequency conversion to it, amplifies it to a transmission signal S15 of a predetermined power, and sends it out via an antenna 20.

The power control signal S20 supplied from the control unit 34 consists of a power-up command or a power-down command for controlling the power-up or the power-down of the transmission power. The transmission unit 9 controls the gain of the variable gain amplifier 18 based on the power control signal S20, to increase the transmission power by one dB with one power-up command, or to lower the transmission power by one dB with one power-down command.

Further, the control unit 34 controls the amplification operation of the variable gain amplifier 18 and monitors the gain value based on the power control signal S20 so as to always keep track of the current transmission power. Accordingly, the control unit 34 increases the transmission power if the current transmission power is smaller than the maximum transmission power and the instruction of the control symbol S5 provided from the demultiplexer 13 is a power-up command. On the other hand, the control unit 34 lowers the transmission power if the current transmission power is greater than the minimum transmission power and the instruction of the control symbol S5 is a power-down command.

However, in case where the transmission power cannot be increased any more since the current transmission power has already reached the maximum transmission power, and the supplied control symbol S5 is a power-up command, the control unit 34 counts the number of receptions of the received control symbol S5 by the counter 36, and stops supplying the power control signal S20 generated based on the control symbol S5 to the transmission unit 9.

That is, in case where a power-up command is supplied even though the current transmission power has already reached the maximum transmission power, the control unit 34 increments the count value of the counter 36 according to the number of times the power-up command is supplied. Incidentally, since the maximum count value of the counter 36 is set to "N" (in this example, N=10), the count value is not incremented over "N" even if the number of power-up commands exceeds "N".

Further, in case where the current count value of the counter 36 is greater than "M" (in this example, M=5), and a power-up command is supplied, the control unit 34 does not immediately lower the transmission power according to the power-down command, but it first counts down the count value of the counter 36 by "one".

Practically, a power-up command is repeatedly supplied from the base station 31 when the communication terminal 32 is lack of transmission power. However, the communication terminal 32 cannot increase the transmission power when the current transmission power has already reached the maximum transmission power, so that the count value of the counter 36 is incremented by the number of times the power-up command is supplied. In this case, if a power-down command due to a transmission error or the like is supplied and the communication terminal 32 immediately lowers the transmission power according to the power-down command, the communication quality is inconveniently degraded.

Therefore, even if a power-down command is begun to be supplied from the base station 31, by first decreasing the count value of the counter 36 instead of immediately lowering the transmission power, and by lowering the transmission power only after the count value becomes smaller than "5", the transmission power can be controlled while taking the safety factor into consideration.

In order to maintain a good communication condition between the communication terminal 32 and the base station 31, it is safer not to lower the transmission power as much as possible. Because it is not until such a communication environment that the communication condition surely has no fear of degradation even if the transmission power is lowered (for instance, such a communication environment that the transmission power can be lowered because the distance between the communication terminal 32 and the base station 31 has become short, or such a communication environment that the transmission power can be lowered because interference waves to the communication terminal 32 have become less) that the transmission power is lowered.

That is, since a power-down command can be supplied due to a transmission error or the like, the communication terminal 32 does not immediately lower the transmission power according to the power-down command. It is not until the communication terminal 32 recognizes that this is not the power-down command supplied due to an error or the like, but the power-down command indicating such the communication environment that the transmission power can be lowered when the power-down command is supplied several times, that the transmission power is lowered.

Accordingly, when the number of times the power-down command is supplied increases and the count value of the counter 36 reaches "M" in due course, the control unit 34 lowers the transmission power by one dB according to the power-down command. That is, by providing a difference between the number of counts based on the power-up command and the number of counts by count-down based on the power-down command, the control unit 34 executes the control of the transmission power with a hysteresis characteristic.

Thus, the control unit 34 does not lower the transmission power until the count value reaches "M" even if a power-down command due to an error or the like is supplied instead of a power-up command. Therefore, the control unit 34 does not immediately lower the transmission power even if a power-down command due to an error or the like is supplied when power-up commands are continuously supplied, whereby the communication condition can be prevented from being deteriorated.

Accordingly, the control unit 34 controls the amplification operation of the variable gain amplifier 18 based on the count value of the counter 36 in consideration of the safety factor so that the control unit 34 does not lower the transmission power until it recognizes that the communication condition becomes good and a sure power-down command is supplied, whereby the communication quality in between the base station 31 and the communication terminal 32 can be maintained.

Figure 6:
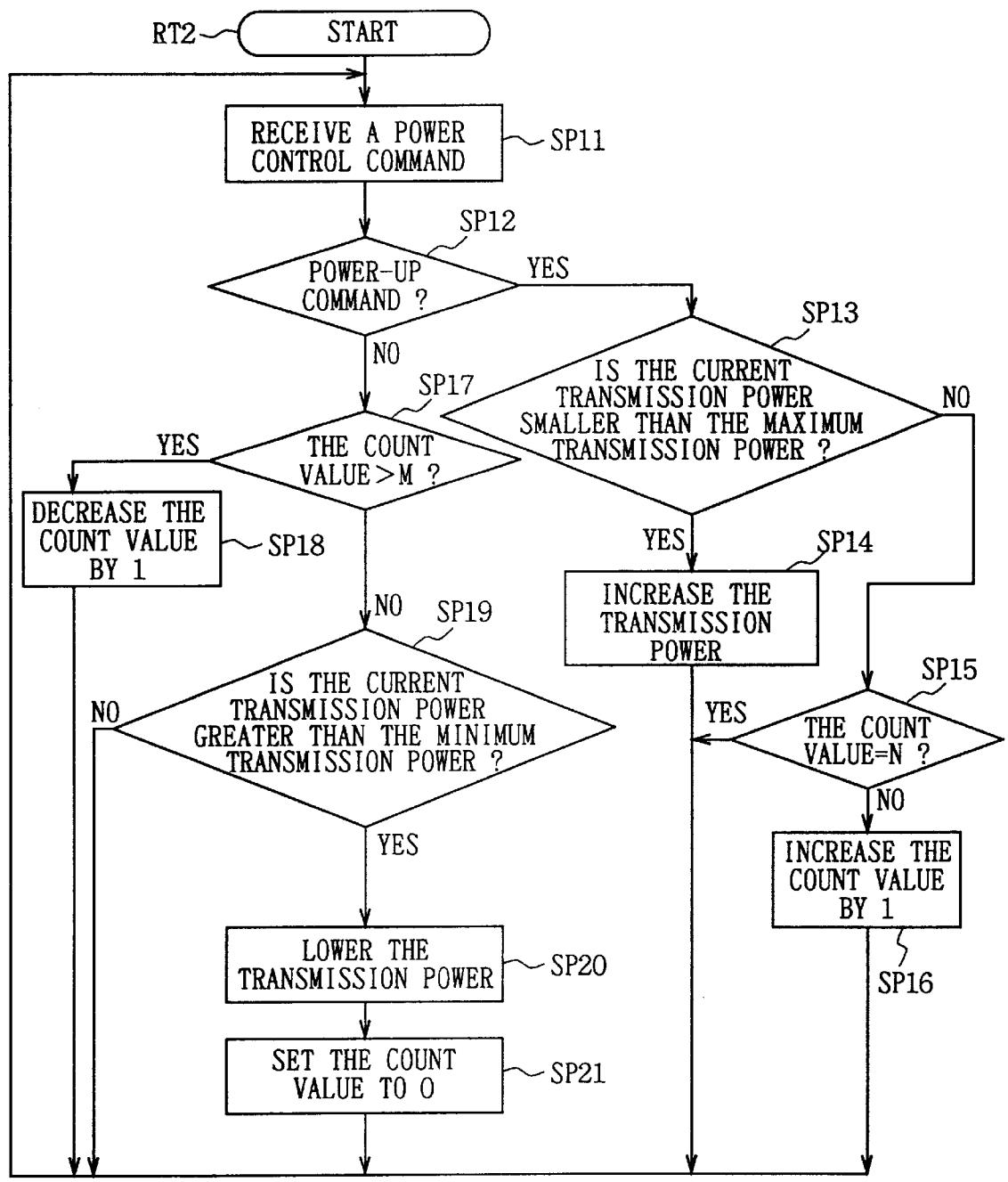
FIG. 6 is a flowchart showing the transmission power control procedure in an embodiment according to the present invention.

Next, with respect to the cellular radio communication system 30, the flowchart of FIG. 6 is used to explain the transmission power control procedure in the control unit 34, which controls the transmission power of the communication terminal 32 based on the control symbol S5 for the power control supplied from the base station 31.

The control unit 34 of the communication terminal 32 begins with the starting step RT2, and moves to the step SP11. In the step SP11, the control unit 34 first receives the control symbol S5 as a power control command from the demultiplexer 13 of the reception unit 7, and moves to the step SP12.

In the step SP12, the control unit 34 determines whether or not the control data for the transmission power instructed by the base station 31 is a power-up command which means the increase of the transmission power, based on the control symbol S5. If the positive result is obtained, the result means a power-up command has occurred, then the control unit 34 moves to the step SP13.

In the step SP13, the control unit 34 determines whether the current transmission power is smaller than the maximum transmission power or not. If the positive result is obtained, the result means that the current transmission power is smaller than the maximum transmission power and there is room to further increase the transmission power, then the control unit 34 moves to the step SP14.

In the step SP14, the control unit 34 sends out the power control signal S20 generated based on the control symbol S5 to the transmission unit 9, to increase the transmission power by one dB with the transmission unit 9, and returns to the step SP11 again.

On the other hand, if the negative result is obtained in the step SP13, the result means that the power-up command has been supplied even though the current transmission power has already reached the maximum transmission power and the transmission power cannot be increased any more. At this time, the control unit 34 increments the count value of the counter 36 and moves to the step SP15.

In the step SP15, the control unit 34 determines whether the count value of the counter 36 has reached "N" (in this example, "10") or not. If the negative result is obtained, the result means the count value of the counter 36 has not been counted up to "N" as yet. At this time, the control unit 34 moves to the step SP16.

In the step SP16, the control unit 34 increments the count value of the counter 36 by the number of supplied power-up commands, and returns to the step SP11 again.

On the other hand, if the positive result is obtained in the step SP15, the result means the count value of the counter 36 has already been counted up to "N" (in this example, "10"), and thus the count value of the counter 36 is not further incremented even if more power-up commands are supplied. At this time, the control unit 34 returns to the step SP11 again.

However, if the negative result is obtained in the step SP12, the result means a power-down command, not a power-up command, has been supplied, and at this time the control unit 34 moves to the step SP17.

In the step SP17, the control unit 34 determines whether the current count value of the counter 36 indicates a count value greater than "M" or not. If the positive result is obtained, the result means that the current value of the counter 36 indicates a count value greater than "M". That is, a power-up command has been supplied a plurality of times even though the transmission power has already reached the maximum transmission power and the plurality of times have been already counted more than the count value "M". At this time, the control unit 34 does not lower the transmission power, but it decreases the count value of the counter 36 by one and returns to the step SP11 again.

On the other hand, if the negative result is obtained in the step SP17, the result means the current count value of the counter 36 is "M". That is, the current count value has reached "M" as a result of decreasing the count value of the counter 36 according to each occurrence of power-down commands, and at this time the control unit 34 moves to the step SP19.

In the step SP19, the control unit 34 determines whether the current transmission power is greater than the minimum transmission power or not. If the negative result is obtained, the result means that a power-down command is supplied even though the current transmission power has already reached the minimum transmission power and the transmission power cannot be lowered any more. At this time, the control unit 34 returns to the step SP11 again while maintaining this state.

On the other hand, if the positive result is obtained in the step SP19, the result means that there is room to further lower the transmission power since the current transmission power is greater than the minimum transmission power. At this time, the control unit 34 moves to the step SP20.

In the step SP20, the control unit 34 sends out the power control signal S20 generated based on the control symbol S5 to the transmission unit 9, lowers the transmission power by one dB with the variable gain amplifier 18 of the transmission unit 9, and moves to the step SP21.

In the step SP21, the control unit 34 resets the count value of the counter 36 from "M" to "0" in order to prepare for controlling the transmission power according to the next new power control command, and returns to the step SP11 again so as to complete the process.

(3) Operation and Effects

According to the above configuration, in case where a power-up command is supplied a plurality of times, with the transmission power having already reached the maximum transmission power, the communication terminal 32 counts up the number of times the power-up command is supplied by the counter 36 while it cannot increase the transmission power any more. However, if a power-down command is supplied once thereafter, it plausibly seems a power-down command due to an error or the like.

Accordingly, the communication quality is degraded if the communication terminal 32 immediately lowers the transmission power according to such wrong power-down command, and therefore the communication terminal 32 first counts down the count value of the counter 36 by one rather than actually lowering the transmission power. However, if a power-down command is supplied a plurality of times, the communication terminal 32 counts down the count value of the counter 36 by the plurality of times. Then, if the count value of the counter reaches "M", the communication terminal 32 determines that the power-down command is not a power-down command due to an error or the like because the power-down command has been continuously supplied a plurality of times. At this time, the transmission power can be lowered according to the power-down command.

Thus, in the communication terminal 32, by controlling the transmission power so that the transmission power is not lowered until the control unit 34 recognizes a real power-down command based on the count value of the counter 36, control of the transmission power based on a wrong power-down command due to a transmission error or the like is eliminated, so that the transmission signal S15 can always be sent out to the base station 31 with the optimum transmission power.

According to the above configuration, in the communication terminal 32, since the control unit 34 controls the transmission power not to be lowered until a power-down command is supplied a predetermined number of times after a power-up command has supplied a plurality of times, the transmission power can be lowered only when a real power-down command is surely recognized, and thus the transmission can always be performed with the optimum transmission power.

(4) Other Embodiments

In the above embodiment, a case is described in which the count value "N" of the counter 36 as counting means is set to "10" at maximum, and the count value "M" as a reference for lowering the transmission power is set to "5" by the control unit 34 as control means. However, the present invention is not limited thereto, but the count value can be set to a count value with arbitrary hysteresis characteristic according to the communication environment, such as setting the count value "N" to "5", and setting the count value "M" to "0".

Further, in the above embodiment, a case is described in which a hysteresis characteristic is provided by setting the count value "N" of the counter 36 to "10" at maximum, and setting the count value "M" as a reference for lowering the transmission power to "5" by the control unit 34. However, the present invention is not limited thereto, but no hysteresis characteristic can be given by setting the count value "N" of the counter 36 to "10" at maximum, and setting the count value "M" as a reference for lowering the transmission power to "10". In this case, since the transmission power is not easily lowered, the communication quality is degraded more difficultly.

Furthermore, in the above embodiment, the description has been made to the transmission power control method for a power-down command in the case where a power-up command is supplied a plurality of times when the transmission power has already reached the maximum transmission power. However, the present invention is not limited thereto, but the present invention can be applied to the transmission control method for a power-up command in the case where a power-down command is supplied a plurality of times when the transmission power has already reached the minimum transmission power. In this case, the communication terminal 32 can obtain the same effect by changing only the control method of the control unit 34.

As described above, according to the present invention, in a transmission power control method in which a control signal for controlling the transmission power is transmitted at the transmission side, and the transmission power is controlled based on the received control signal at the reception side; with the power value of the transmission power having reached the limit value of a power control range, if the instructions of the received control signal are to control the power value in the direction of allowing it to exceed the power control range, the number of receptions of the control signal is counted, and if the instructions of the control signal received thereafter are to control the power value in the direction of not allowing it to exceed the power control range, the count value of the number of receptions is decreased, and it is not until the count value reaches a predetermined value that the power value is controlled in the direction of not allowing it to exceed the power control range; whereby the transmission power is not immediately lowered even if an error or the like causes the reception of the control signal controlling the power value in a wrong direction, and it is not until the normal control signal is received a predetermined number of times that the transmission power can be controlled; so that malfunction can be prevented when the transmission power is controlled. Thus, a transmission power control method can be realized for enabling the sending to be always performed with the optimum transmission power.

Further, according to the present invention, in a base station apparatus which controls the transmission power of a transmission signal based on the control signal sent from a communication terminal as a mobile station, by providing receiving means for receiving the control signal; counting means for counting the number of receptions of the control signal; control means for counting the number of receptions of the control signal by the counting means if the instructions of the received control signal are to control the power value of the transmission power in the direction of allowing it to exceed a power control range, with the power value having reached the limit value of the power control range, decreasing the count value of the number of receptions if the instructions of the control signal received thereafter are to control the power value in the direction of not allowing it to exceed the power control range, and not controlling the power value in the direction of not allowing it to exceed the power control range until the count value reaches a predetermined value; and transmitting means for performing the transmission to the mobile station with the transmission power controlled by the control means, the transmission power is not immediately lowered even if an error or the like causes the reception of the control signal controlling the power value in a wrong direction, and the transmission power can not be controlled until the normal control signal is received a predetermined number of times, so that malfunction can be prevented in the controlling of the transmission power to maintain the communication quality between the mobile station and the base station apparatus. Thus, a base station apparatus can be realized for enabling the sending to be always performed with the optimum transmission power.

Furthermore, in the present invention, in a communication terminal which controls the transmission power of a transmission signal based on the control signal sent from a base station apparatus as a fixed station, by providing receiving means for receiving the control signal; counting means for counting the number of receptions of the control signal; control means for counting the number of receptions of the control signal by the counting means if the instructions of the received control signal are to control the power value of the transmission power in the direction of allowing it to exceed a power control range, with the power value having reached the limit value of the power control range, decreasing the count value of the number of receptions if the instructions of the control signal received thereafter are to control the power value in the direction of not allowing it to exceed the power control range, and not controlling the power value in the direction of not allowing it exceed the power control range until the count value reaches a predetermined value; and transmitting means for performing the transmission to the base station apparatus with the transmission power controlled by the control means, the transmission power is not immediately lowered even if an error or the like causes the reception of the control signal controlling the power value in a wrong direction, and the transmission power can not be controlled until the normal control signal is received a predetermined number of times, so that malfunction can be prevented in the controlling of the transmission power to maintain the communication quality between the base station apparatus and the communication terminal. Thus, a communication terminal can be realized for enabling the sending to be always performed with the optimum transmission power.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmission power control method for transmitting a control signal for controlling a transmission power at the transmission side, and controlling said transmission power based on said control signal received at the reception side, said transmission power control method comprising the steps of:

with a power value of said transmission power having reached a limit value of a power control range, if an instruction of said received control signal is to control said power value in the direction of allowing it to exceed said control value, counting the number of receptions of said control signal; and if the instruction of said control signal received thereafter is to control said power value in the direction of not allowing it to exceed said power control range, decreasing the count value of said number of receptions, and not controlling said power value in the direction of not allowing it to exceed said power control range until said count value reaches a predetermined value.

2. The transmission power control method according to claim 1, wherein
said limit value of said power control range is the upper limit value of said transmission power.

3. The transmission power control method according to claim 1, wherein
said limit value of said power control range is the lower limit value of said transmission power.

4. The transmission power control method according to claim 1, wherein
by setting said predetermined value to a count value other than zero, when the number of receptions of said control signal controlling said power value in the direction of not allowing it to exceed said power control range reaches a predetermined number of receptions, which is smaller than the number of receptions of said control signal controlling said power value in the direction of allowing it to exceed said power control range, said power value of said transmission power is controlled.

5. A base station apparatus for controlling a transmission power of a transmission signal based on a control signal transmitted from a communication terminal as a mobile station, said base station apparatus comprising:

receiving means for receiving said control signal;
counting means for counting the number of receptions of said control signal;
control means for counting the number of receptions of said control signal by said counting means if an instruction of said received control signal is to control the power value of said transmission power in the direction of allowing it to exceed a power control range, with the power value having reached a limit value of said power control range, decreasing the count value of said number of receptions if the instruction of said control signal received thereafter is to control said power value in the direction of not allowing it to exceed said power control range, and not controlling said power value in the direction of not allowing it to exceed said power control range until said count value reaches a predetermined value; and transmitting means for transmitting said transmission signal to said mobile station with the transmission power controlled by said control means.

6. The base station apparatus according to claim 5, wherein
said limit value of said power control range is the upper limit value of said transmission power.

7. The base station apparatus according to claim 5, wherein
said limit value of said power control range is the lower limit value of said transmission power.

8. The base station apparatus according to claim 5, wherein
by setting said predetermined value to a count value other than zero, when the number of receptions of said control signal controlling said power value in the direction of not allowing it to exceed said power control range reaches a predetermined number of receptions, which is smaller than the number of receptions of said control signal controlling said power value in the direction of allowing it to exceed said power control range, said power value of said transmission power is controlled.

9. A communication terminal for controlling a transmission power of a transmission signal based on a control signal transmitted from a base station apparatus as a fixed station, said communication terminal comprising:

receiving means for receiving said control signal;
counting means for counting the number of receptions of said control signal;
control means for counting the number of receptions of said control signal by said counting means if an instruction of said received control signal is to control the power value of said transmission power in the direction of allowing it to exceed a power control range, with the power value having reached a limit value of said power control range, decreasing the count value of said number of receptions if the instruction of said control signal received thereafter is to control said power value in the direction of not allowing it to exceed said power control range, and not controlling said power value in the direction of not allowing it to exceed said power control range until said count value reaches a predetermined value; and transmitting means for transmitting said transmission signal to said base station apparatus with the transmission power controlled by said control means.

10. The communication terminal according to claim 9, wherein
said limit value of said power control range is the upper limit value of said transmission power.

11. The communication terminal according to claim 9, wherein
said limit value of said power control range is the lower limit value of said transmission power.

12. The communication terminal according to claim 9, wherein by setting said predetermined value to a count value other than zero, when the number of receptions of said control signal controlling said power value in the direction of not allowing it to exceed said power control range reaches a predetermined number of receptions, which is smaller than the number of receptions of said control signal controlling said power value in the direction of allowing it to exceed said power control range, said power value of said transmission power is controlled.

\* \* \* \* \*